(12) United States Patent
Kribernegg et al.

(10) Patent No.: US 11,518,458 B2
(45) Date of Patent: Dec. 6, 2022

(54) METHOD FOR THE PRODUCTION OF MOTOR VEHICLES

(71) Applicant: MAGNA STEYR Fahrzeugtechnik AG & Co KG, Graz (AT)

(72) Inventors: Christoph Kribernegg, Leibnitz (AT); Patrick Leonhardsberger, Graz (AT); Manfred Pichler, Graz (AT); Michael Gfoellner, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 199 days.

(21) Appl. No.: 16/932,168

(22) Filed: Jul. 17, 2020

(65) Prior Publication Data
US 2021/0024153 A1 Jan. 28, 2021

(30) Foreign Application Priority Data
Jul. 25, 2019 (EP) .................................. 19188413

(51) Int. Cl.
*B62D 65/02* (2006.01)
*B23P 19/04* (2006.01)
*B23Q 1/00* (2006.01)

(52) U.S. Cl.
CPC ............ *B62D 65/026* (2013.01); *B23P 19/04* (2013.01); *B23Q 1/0081* (2013.01)

(58) Field of Classification Search
CPC ... B62D 65/026; B62D 65/18; B23P 2700/50; B23P 19/04; B23Q 1/0072;
(Continued)

(56) References Cited

U.S. PATENT DOCUMENTS

| 2008/0172857 A1 | 7/2008 | Brinkworth et al. |
| 2009/0075796 A1* | 3/2009 | Doll ..................... B25J 15/0491 |
| | | 901/41 |

(Continued)

FOREIGN PATENT DOCUMENTS

| CN | 101522510 A | 9/2009 |
| CN | 103085000 A | 5/2013 |

(Continued)

OTHER PUBLICATIONS

European Search Report for European Patent Application No. 19188413.9, dated Jan. 15, 2020, 4 pages.

(Continued)

*Primary Examiner* — Mahdi H Nejad
(74) *Attorney, Agent, or Firm* — Jordan IP Law, LLC; Todd A. Vaughn

(57) ABSTRACT

A method for production of a motor vehicle that includes providing a device for positioning motor vehicle parts that comprises a base frame having at least one base module arranged thereon, and at least one exchangeable docking plate configured for connection to the base module, the at least one exchangeable docking plate having arranged thereon a plurality of receivers configured to hold the motor vehicle parts, transferring the at least one exchangeable docking plate to the base frame, connecting, at a configuration station, the at least one exchangeable docking plate to the base module, fitting, at a work station, a motor vehicle part to the at least one exchangeable docking plate, such that the motor vehicle part is held by the receivers, and equipping the motor vehicle part with add-on parts.

5 Claims, 6 Drawing Sheets

(58) Field of Classification Search
CPC .............. B23Q 1/0081; B25B 5/006; B23K 2101/006; B25J 9/0084; Y10T 29/53539
USPC .......... 269/309, 244, 296, 48.1, 55, 97, 268, 269/282; 29/822; 248/220.21
See application file for complete search history.

(56) References Cited

U.S. PATENT DOCUMENTS

| | | | | |
|---|---|---|---|---|
| 2013/0113149 | A1* | 5/2013 | Yeum | B23K 37/0443 269/60 |
| 2018/0009113 | A1* | 1/2018 | Lauder | B25J 15/0491 |
| 2018/0273243 | A1* | 9/2018 | Kilibarda | B23K 37/0426 |
| 2018/0358250 | A1* | 12/2018 | Sekiya | H01L 21/67769 |
| 2021/0024152 | A1* | 1/2021 | Kribernegg | B23Q 1/0072 |
| 2021/0356482 | A1* | 11/2021 | Moffitt | G01N 35/0099 |

FOREIGN PATENT DOCUMENTS

| | | | |
|---|---|---|---|
| CN | 105882789 A | * | 8/2016 |
| CN | 109037097 A | | 12/2018 |
| CN | 110461536 A | | 11/2019 |
| DE | 19820094 A1 | | 11/1999 |
| DE | 202017102155 U1 | | 7/2018 |
| JP | H05277848 A | | 10/1993 |
| KR | 2003005855 A | | 1/2003 |

OTHER PUBLICATIONS

Office Action for CN Patent Application No. 202010697392.7, dated May 30, 2022, 6 pages.

* cited by examiner

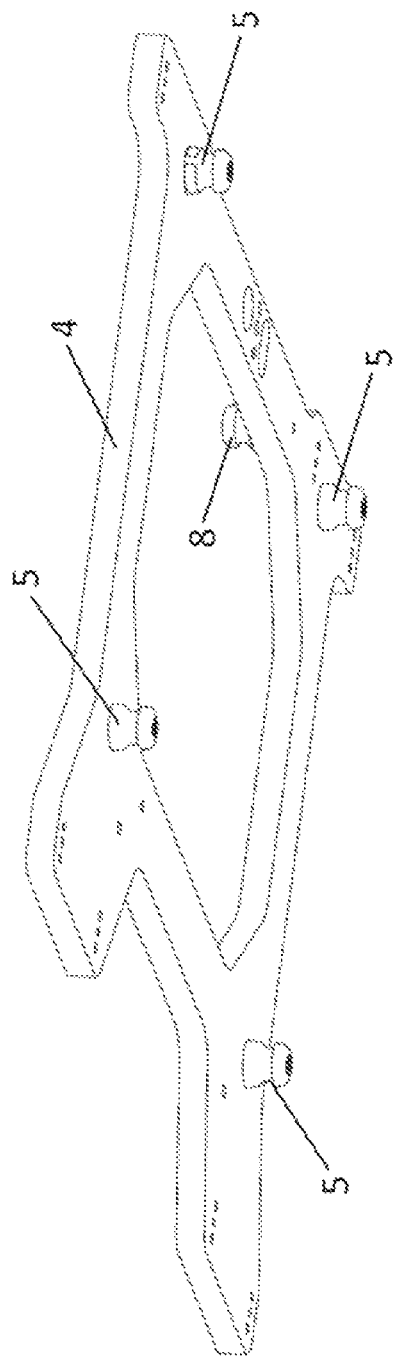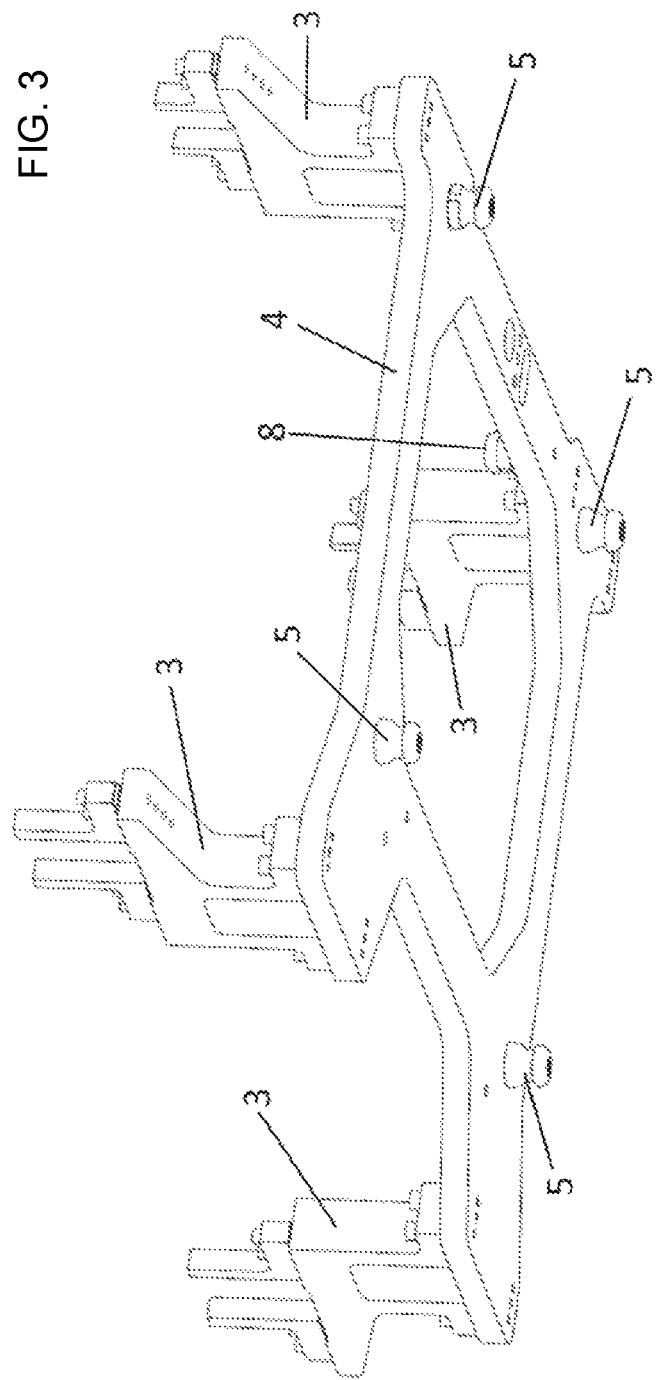

METHOD FOR THE PRODUCTION OF MOTOR VEHICLES

CROSS-REFERENCE TO RELATED APPLICATIONS

The present application claims priority under 35 U.S.C. § 119 to European Patent Publication No. EP 19188413.9 (filed on Jul. 25, 2019), which is hereby incorporated by reference in its complete entirety.

TECHNICAL FIELD

The automated production of motor vehicles is nowadays well known. Body parts and/or chassis parts in particular are conventionally equipped with further add-on parts or assembled to form larger vehicle modules at various work stations along a production line. It is thereby increasingly necessary to be able to produce different motor vehicle types in the same work stations with as small a time lag as possible. For the production of different motor vehicle types, it is usually necessary to modify the work station. Since the parts of different motor vehicle types mostly have different geometries, positioning and holding devices, for example, for the motor vehicle parts must be modified or exchanged.

German Patent Publication No. DE 198 20 094 A1 discloses, for example, an installation for positioning and welding body parts of different motor vehicle types, having a mounting frame which is guided on a conveyor track and which has receivers for at least some body parts, having positioning devices for the body parts, and having at least one robotic arms which may be used for welding work, wherein the mounting frame has positioning devices for at least some body parts and clamping devices for the body parts which may be actuated from outside, wherein there is arranged beneath the conveyor track a further conveyor track on which in each case one of a plurality of auxiliary mounting frames is guided, wherein parking positions for the auxiliary mounting frames are provided next to the lower conveyor track, wherein the auxiliary mounting frames each have receivers for further body parts of different motor vehicle types as well as devices for positioning and bracing with the mounting frame, and wherein a lifting device for the auxiliary mounting frame is provided.

SUMMARY

Embodiments relate to an efficient method for the production of motor vehicles, which permits simple and rapid adaptation to different vehicle types.

Embodiments also relate to a device which makes possible such an efficient method for the production of motor vehicles.

In accordance with embodiments, a method for the production of motor vehicles via a device for positioning motor vehicle parts, the device comprising a base frame, at least one base module arranged on the base frame, a plurality of receivers which are configured to hold the motor vehicle parts, and at least one exchangeable docking plate, releasably connected to the base module and upon which the receivers are arranged. The method may comprise: transferring a docking plate to a base frame equipped with at least one base module and releasably connecting the docking plate to the base module in a configuration station; fitting, in a work station, a motor vehicle part to the docking plate, so that the motor vehicle part is held by the receivers of the docking plate; and equipping the motor vehicle part with add-on parts.

In accordance with embodiments, a device is used for the production of motor vehicles, the device comprising exchangeable docking plates which are configured to hold various motor vehicle parts such as, for example, a vehicle body or a vehicle body part. In that way, different docking plates may thereby be fitted to the same base frame in order to construct different motor vehicle types.

In accordance with embodiments, the motor vehicle parts may be held for further processing via receivers which are usually precisely matched to the motor vehicle parts to be received, and accordingly, are configured to correspond to a motor vehicle type. The receivers, however, are not fastened directly to a frame of a work station or device, for example, but instead, are fastened to an exchangeable docking plate. Each docket plate is a substantially rectangular-shaped element which may be manipulated in an automated manner, in particular, via gripping systems or robotic arms, in order to be connected to a base module in a simple manner. Therefore, in order to produce a different motor vehicle type, the docking plate of the device may be changed in a simple manner and, particularly, in an automated manner, so that new receivers which fit the new motor vehicle parts are also provided.

In accordance with embodiments, practice of a method for the production of motor vehicles may use a docking plate supplied to a base frame equipped with at least one base module. The docking plate is configured for releasable connection to the base module which itself is arranged on the base frame. The base frame, or the base module arranged on the base frame, is equipped with the docking plate in a configuration station.

In accordance with embodiments, in a work station, which is usually spatially separate from the configuration station, a motor vehicle part, in particular, a vehicle body or a vehicle body part, is fitted to the docking plate so that the motor vehicle part is held by the receivers of the docking plate. The motor vehicle part is then equipped with add-on parts in order to add to or complete the motor vehicle that is to be produced. The motor vehicle part may, for example, be equipped with add-on parts in the same work station in which it is fitted.

In accordance with embodiments, via this method for the production of motor vehicles, the same base frames and the same base modules may be used for the production of different motor vehicle types. The base frames, therefore, do not have to be disposed of, for example, on conversion to a different vehicle type. Instead, suitable docking plates simply have to be fitted to the base frames and the base modules in a configuration station. The base frames are therefore reusable. Suitable docking modules for different vehicle types may be stored in a space-saving manner and made available as required.

In accordance with embodiments, the device for carrying out the method described herein, namely the device for positioning motor vehicle parts, will be described in greater detail hereinbelow.

In accordance with embodiments, the docking plate may be connected to the base module in a precisely positioned manner and/or with precise tolerances.

In accordance with embodiments, the docking plate may comprise a plurality of bolts, in particular, draw-in clamping bolts, to facilitate connection of the docking plate to a corresponding base module in a precisely positioned manner. The docking plate may, for example, comprise two or four bolts, or draw-in clamping bolts, which may be mounted in the region of the corners of a quadrangularly-shaped docking plate. In an operating position, the bolts may be arranged on the underside of the docking plate and may project vertically downwards (and thus, perpendicular) relative to the planar surface of the docket plate.

In accordance with embodiments, the base module may comprise at least one clamping device, such as, for example, a zero-point clamping device and/or a locking device, which is configured to clamp the bolts, in particular, draw-in clamping bolts, and/or to connect and/or lock the docking plate to the base module in another way. The base module may form a zero-point clamping system and/or zero-point locking system configured to receive a docking plate in a precisely positioned manner and/or with precise tolerances.

In accordance with embodiments, the base module, fixedly mounted on a base frame, with one or more zero-point clamping devices and at least one exchangeable or releasable docking plate on the base module, may together collectively form a "docking module."

In accordance with embodiments, the base module may comprise a media interface configured to transmit or send a medium, such as, for example, compressed air and/or electrical signals and/or electric current, to the base module. The compressed air may serve to lock the draw-in clamping bolts located on the docking plate to the base module, in particular, to the zero-point system. The transmission of electrical signals and/or electric current to the base module may also take place inductively.

In accordance with embodiments, the receivers may comprise supports, brackets and/or clamps. The receivers may be configured to be specific to a particular motor vehicle type. The receivers may be configured as separate components and may be connected, in particular, releasably and exchangeably, to the docking plate.

In accordance with embodiments, the docking plate may comprise holding elements, for example bolts, clamping bolts, or similar elements, which are configured to be engaged by a gripping system to thereby facilitate positioning of the docking plate on the base module and/or removal of the docking plate from the base module.

In accordance with embodiments, the device may comprise at least one gripping system, such as, for example, one or more robotic arms, configured to manipulate the docking plate by positioning the docking plate on the base module and/or removing the docking plate from the base module. The docking plate may be collected from a storage frame/rack by the gripping system in order to be connected to the base module and deposited in the storage frame/rack by the gripping system after the docking plate has been removed from the base module.

In accordance with embodiments, the device may comprise at least one second docking plate, which may be interchangeable in an automated manner. The second docking plate may be connected, in a precisely positioned manner, to the same base module in which the first docking plate may be connected. A plurality of second receivers may be arranged on the second docking plate, the second receivers being structurally and/or operationally different from the first receivers of the first docking plate. Therefore, at least two docking plates of different forms may be connected to a base module. The different docking plates may be used for the production of different vehicle types. The base frame and the base modules do not have to be exchanged for this purpose.

In accordance with embodiments, it is also possible that some docking plates may not have receivers since, for example, for the production of a particular vehicle type, only two docking plates equipped with receivers may be required on a base frame having three base modules. An empty docking plate, or a docking plate without receivers, may then be docked with or connected to a base module, for example, in order to protect or cover the clamping devices.

In accordance with embodiments, the device comprises at least two, or at least three base modules, and at least two, or at least three docking plates which are exchangeable in an automated manner. The docking plates, with corresponding receivers arranged thereon, may be connected to a corresponding base module in a precisely positioned manner. Accordingly, a plurality of base modules for the simultaneous connecting of a plurality of docking plates may be formed in a base frame.

In accordance with embodiments, apart from an automated exchange of a docking plate, a docking plate may also be exchangeable manually, for example, by lifting the docking plate with a manually-controlled manipulator or stacker.

In accordance with embodiments, for positioning motor vehicle parts during the production of motor vehicles of a first motor vehicle type and for the production of motor vehicles of a second motor vehicle type, a base module for the production of motor vehicles of the first motor vehicle type may be equipped in an automated manner with a first docking plate having first receivers arranged thereon which are configured to hold motor vehicle parts of the first motor vehicle type. A base module for the production of motor vehicles of the second motor vehicle type may be equipped in an automated manner with a second docking plate having second receivers arranged thereon which are configured to hold motor vehicle parts of the second motor vehicle type.

In accordance with embodiments, for the reconfiguration of a device used for the production of different motor vehicle types, the base frame and the base modules may be reusable, and only the clamped docking plates with their vehicle-type-specific receivers may be exchangeable.

In accordance with embodiments, a docking plate may be for supplied, to the base frame equipped with the at least one base module in the configuration station, by removal (via automation) of the docking pate from a storage frame/rack via a gripping system.

In accordance with embodiments, the space requirement for storage is significantly reduced, since only individual docking plates, including type-specific receivers, have to be stored in the storage frame/rack, and the supporting base frame for another vehicle type does not have to be parked or exchanged, but may immediately be used again after it has been loaded with the appropriate docking plates that fit the specific vehicle type.

In accordance with embodiments, after the motor vehicle part has been equipped with add-on parts, the equipped motor vehicle part may be removed from the docking plate and then the base frame, with the at least one base module arranged thereon, such as, for example, with the docking plate connected to the base module, may be transported to a configuration station, for example to the same configuration station in which the base frame was previously equipped with the docking plate. Alternatively or additionally, before it is transported to a configuration station, the base frame, with or without base module and docking plate, may be transported to a storage station.

In accordance with embodiments, when a project has ended, base frames no longer have to be scrapped or disposed of, but may immediately be used again for the next project, or the next vehicle type.

In accordance with embodiments, for the production of two motor vehicles of different motor vehicle types, two different docking plates may be connected to two base modules arranged on the same base frame. The different motor vehicle types are then produced at stations "in series with one another."

In accordance with embodiments, for the production of two motor vehicles of different motor vehicle types, two different docking plates may also be connected to two base modules arranged on two different base frames. The different motor vehicle types are then produced at stations "in parallel with one another."

In accordance with embodiments, the storage positions for individual docking plates in the storage frame/rack, may be electronically recorded in a memory unit. As used herein, "individual" docking plate is to mean that the information recorded in a specific docking plate with specific properties and/or with a unique identification number is located at that storage position, and not merely an arbitrary docking plate. Characteristic values, such as, for example, characteristic tolerance values for the individual docking plates may be recorded in the memory unit. The characteristic tolerance values for individual docking plates may be calculated from measured tolerance values of a base frame with a base module and with the individual docking plate and from measured tolerance values of the base frame with the base module without the individual docking plate. Characteristic tolerance values for the docking plates, thus, do not have to be measured directly at the docking plates, whereby a more efficient production sequence, or shorter cycle times, may be achievable.

In accordance with embodiments, a control unit may be configured to control the gripping system in such a manner that, in response to the recorded measured values and/or on the recorded storage positions, an individual docking plate may be removed from the storage frame/rack for supply to the base frame equipped with the at least one base module in the configuration station. It is possible, for example, to remove and fit to a base frame a docking plate whose geometric deviations from a desired value compensate for the deviations of the base frame used and/or of the base module used, so that, overall, it is possible to achieve smaller deviations, or better tolerance values, for the device on a whole comprising the base frame that includes the base module connected to a docking plate.

In accordance with embodiments, a device for the production of motor vehicles may comprise a device for positioning motor vehicle parts, as described herein; a storage frame/rack configured to hold a plurality of docking plates; and a gripping system, such as, for example, a robotic arms, which is configured to manipulate the docking plate by removing the docking plate from a storage frame/rack, transferring the docking plate to a corresponding base frame equipped with at least one base module, and connecting the docking plate to the base module.

In accordance with embodiments, additionally or alternatively, the device may comprise a control unit configured to control the gripping system in such a manner that an individual docking plate may be removed from the storage frame/rack in response to recorded measured values and/or on recorded storage positions, in the manner described in detail herein. The individual docking plate may then be transferred by the gripping system to the base frame equipped with the at least one base module.

DRAWINGS

Embodiments will be illustrated by way of example in the drawings and explained in the description below.

FIG. 3 illustrates a three-dimensional bottom view of a docking plate of the device of FIG. 1, without receivers.

FIG. 4 illustrates a three-dimensional bottom view of a docking plate of the device of FIG. 1, with receivers.

DESCRIPTION

Figure 1:
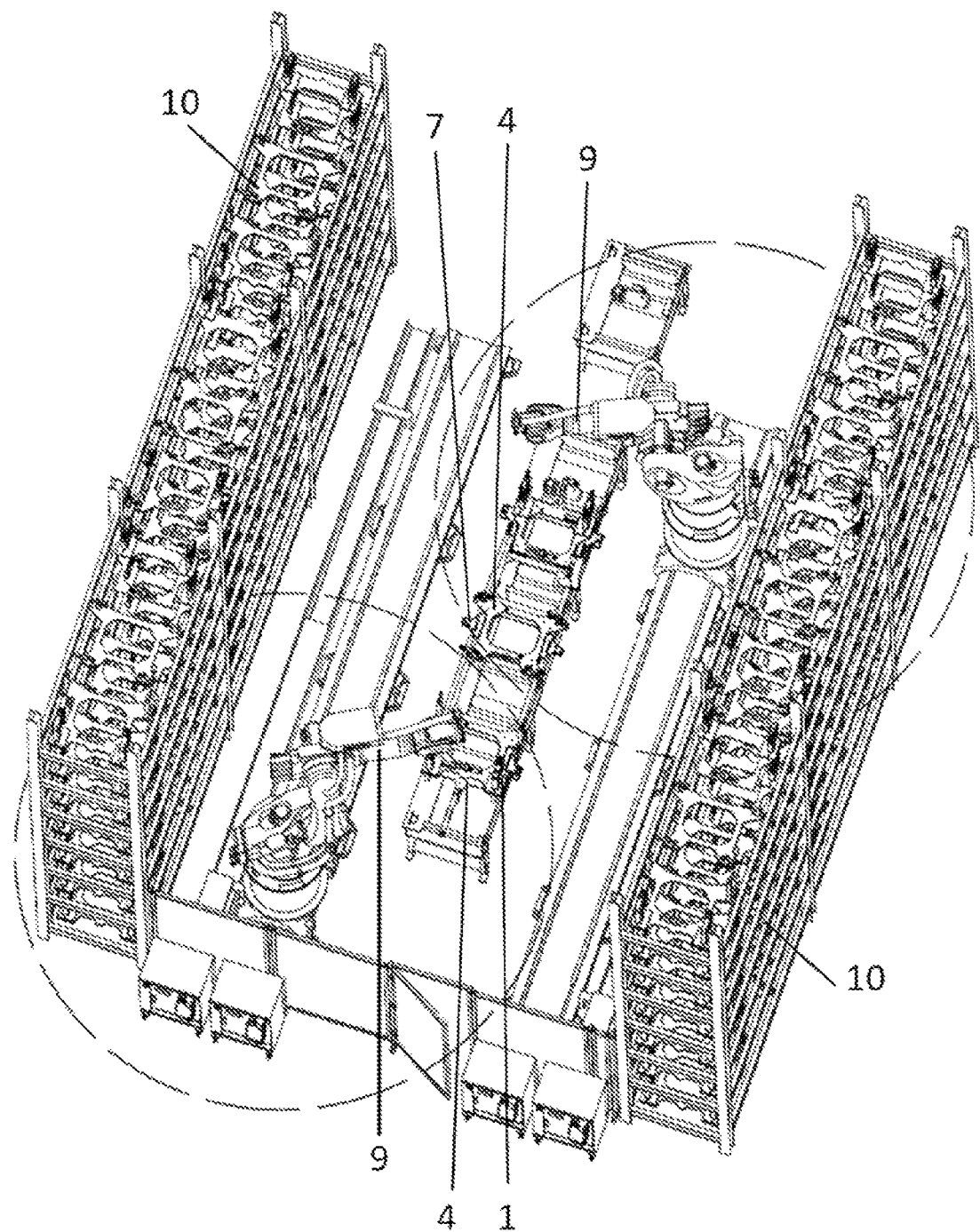
FIG. 1 illustrates a three-dimensional view of a device for production of motor vehicles that comprises a device for positioning motor vehicle parts, in accordance with embodiments.

FIG. 1 illustrates a device for the production of motor vehicles, comprising a device for positioning motor vehicle parts, and such a positioning device may be used in accordance with a method for the production of motor vehicles.

The motor vehicle parts may be positioned on docking plates 4 for further processing, in particular, for equipping the motor vehicle parts with additional components of the motor vehicle that is to be produced. A plurality of docking plates 4 may be received on a common base frame 1 via a connection with base modules 2 (illustrated in FIG. 2). The base modules 2 and the docking plates 4 may have a generally flat or planar structural configuration. When viewed from above, the base modules 2 and the docking plates 4 have a rectangular or square shape/cross-section. In particular, the base modules 2 and the docking plates 4 may substantially form a rectangular or square frame, in which the frame of a docking plate 4 is to substantially structurally match or correspond to/with the frame of a base module 2.

The docking plates 4 may be held ready in one or more storage frames/racks 10, for example, to the side of the base frame 1, and may be removed from their position in the storage frame/rack 10 by gripping systems 9 that may comprise, for example, one or more robotic arms, and positioned on the base modules 2, in order to provide corresponding receivers 3 (illustrated in FIG. 2) for the production of a specific vehicle type.

The device comprises a base frame 1, a plurality of base modules 2 arranged on the base frame 1, and docking plates 4 which may be exchanged in an automated manner. The docking plates 4 may be connected to the base modules 2 in a precisely positioned manner. All of the base modules 2 and all of the docking plates 4 have the same structural dimensions, in order that each docking plate 4 may be connected as desired to a corresponding base modules 2.

Figure 2:
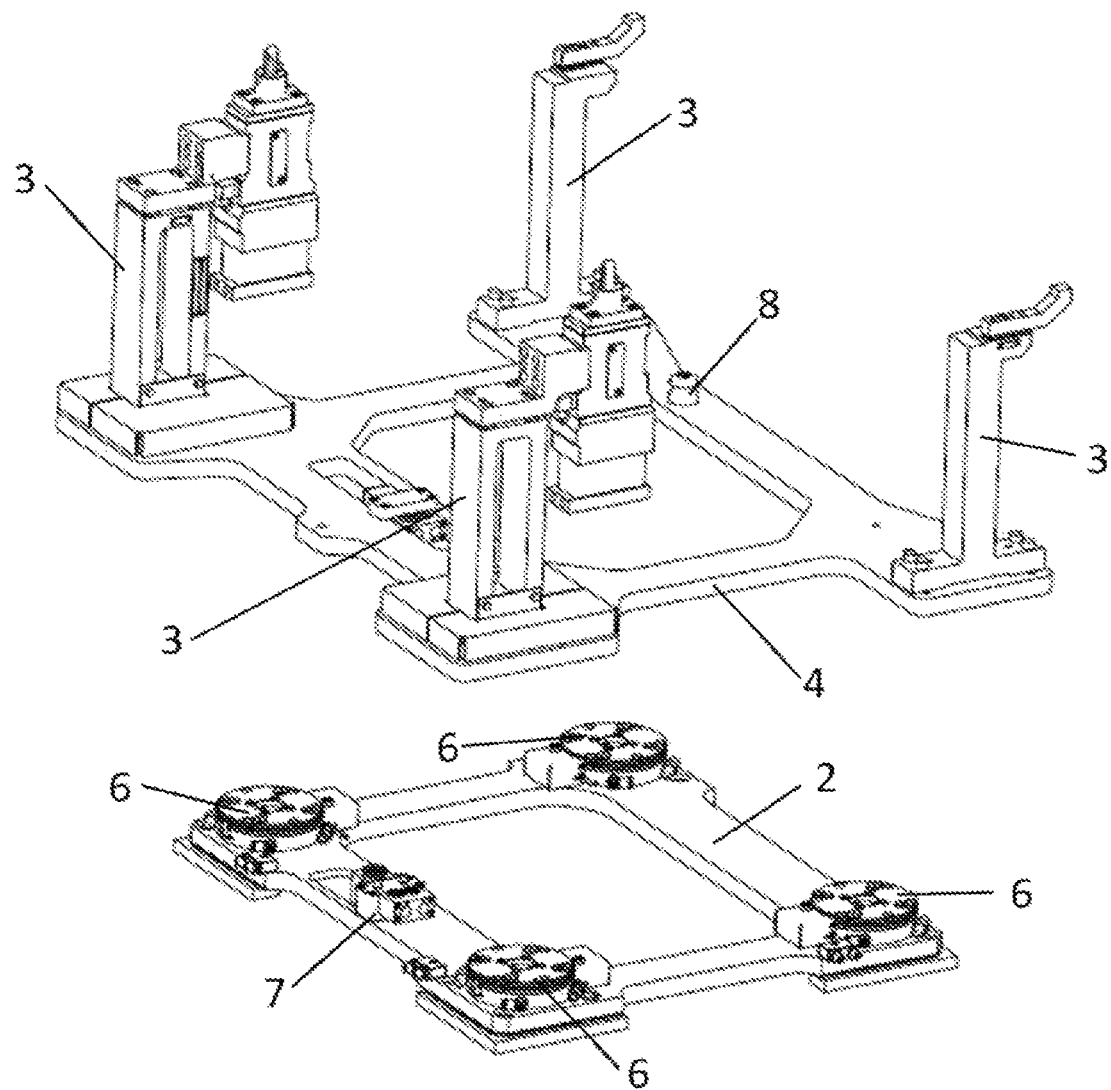
FIG. 2 illustrates a three-dimensional top view of a base module and a docking plate of the device of FIG. 1.

As is illustrated in FIG. 2, a plurality of, for example four, receivers 3 may be arranged on each of the docking plates 4, and may be configured to hold motor vehicle parts in a predetermined position. The receivers 3 may comprise supports, brackets and/or clamps and/or retractable/extendable locating pins.

As illustrated in FIGS. 3 and 4, a docking plate 4 has on an underside surface thereof, a plurality of bolts 5. For example, each docking plate 4 may have four draw-in clamping bolts 5 to facilitate connection of the docking plate 4 to a base module 2 in a precisely positioned manner.

As illustrated in FIG. 2, a base module 2 therefore has, four correspondingly positioned clamping devices 6 that may comprise zero-point clamping devices, which are configured to clamp the bolts 5 of a corresponding docking plate 4. The base module 2, thus, may comprise a zero-point clamping system.

The base module 2 may comprise a media interface 7 to transmit a medium, such as, for example, compressed air and/or electrical signals and/or electric current, to the base module 2. The compressed air may serve, for example, to lock draw-in clamping bolts 5 located on the docking plate 4 to the zero-point system, or to the base module 2, via clamping devices 6, preferably zero-point clamping devices.

The docking plate 4 also comprises on an upper side thereof, a plurality of holding elements 8, for example, bolts, clamping bolts, or the like. The holding elements 8 may be configured to position the docking plates 4 on the base module 2 and/or remove the docking plates 4 from the base module 2 via the gripping system 9 (illustrated in FIG. 1) which is to engage the holding elements 8.

For the optional configuration of such a device for the positioning of motor vehicle parts for the production of motor vehicles of a first motor vehicle type, the base module 2 may be equipped with a docking plate 4 in an automated manner via the gripping system 9. The docking plate 4 may have a plurality of receivers 3 arranged thereon which are configured to hold motor vehicle parts of the first motor vehicle type.

For the optional configuration of such a device for the positioning of motor vehicle parts for the production of motor vehicles of a second motor vehicle type, the base module 2 may be equipped with a second docking plate 4 (that differs from the first docking plate 4) in an automated manner via gripping system 9. The second docking plate 4 may have a plurality of second receivers 3 arranged thereon which are configured to hold motor vehicle parts of the motor vehicle of the second motor vehicle type. The second receivers 3 are thus at least partially different from the receivers 3 so that only different motor vehicle parts may be positioned, or motor vehicle parts may only be positioned in a different way, in order to produce a different motor vehicle type.

Figure 5:
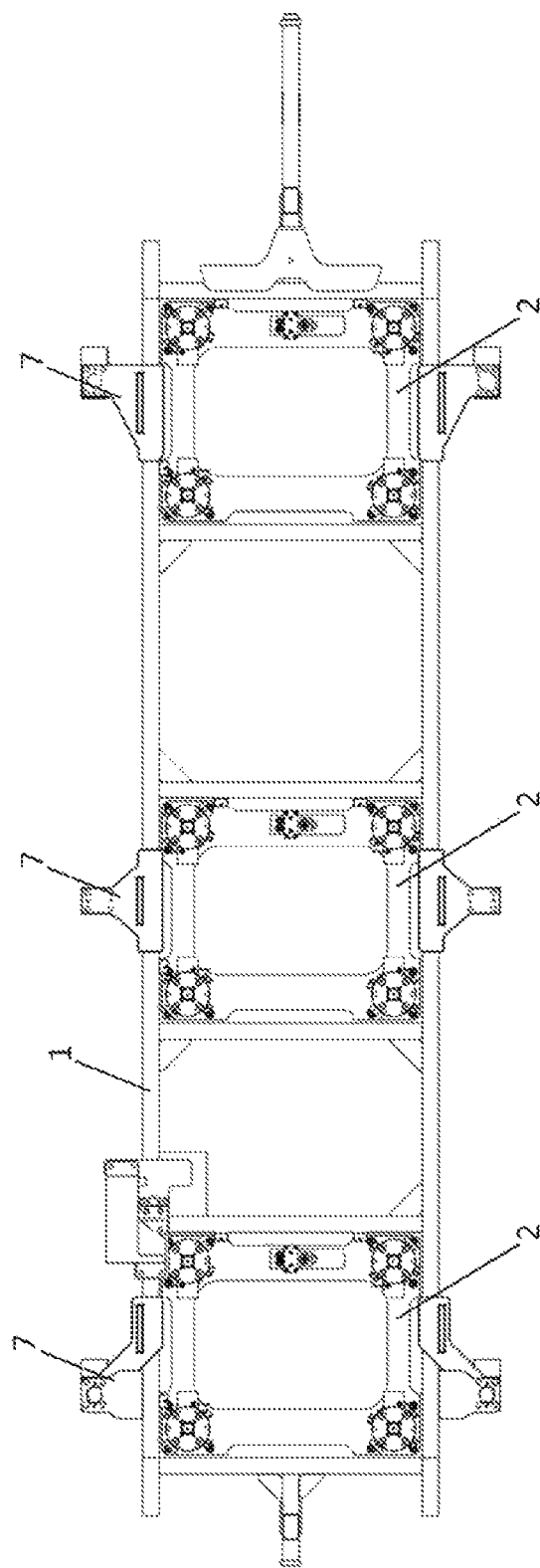
FIG. 5 illustrates a plan view of a base frame with three base modules of the device of FIG. 1.

FIG. 5 illustrates a plan view of a base frame 1 with a plurality of base modules 2 (each having a media interface 7) of the device in accordance with embodiments (as illustrated in FIG. 1). The base frame 1 accordingly serves to receive a plurality of docking plates 4. Each base module 2.

Figure 6:
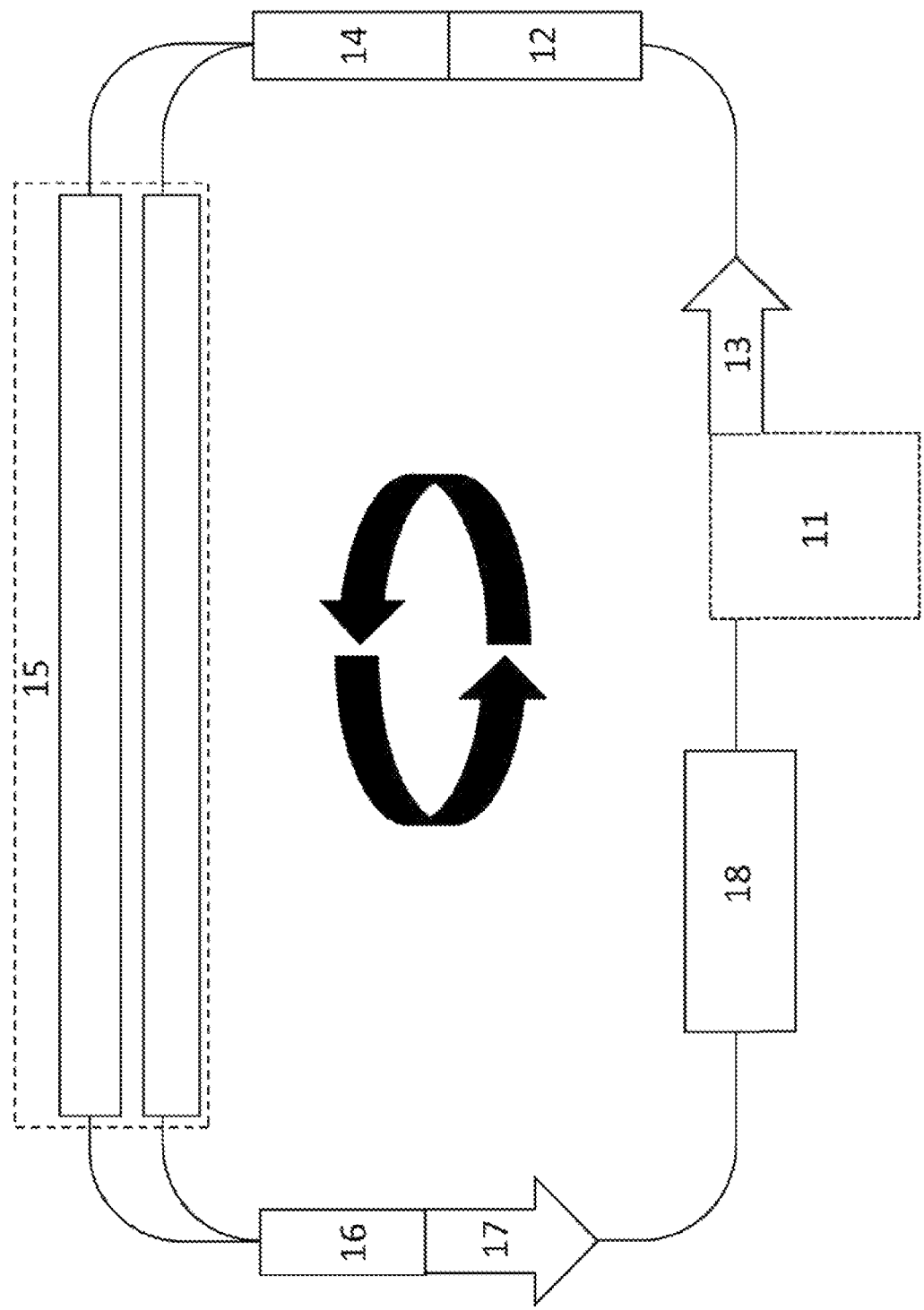
FIG. 6 illustrates a schematic representation of a method for the production of motor vehicles, in accordance with embodiments.

FIG. 6 illustrates a schematic representation of a method for the production of motor vehicles, in accordance with embodiments.

In configuration station 11, which has, for example, at least the equipment and/or components illustrated in FIG. 1. The docking plates 4 are to be delivered or transferred to base frames 1 that are equipped with at least one base module 2. The docking plates 4 are then connected to the respective base modules 2. Changes during the production of a different vehicle type may accordingly be carried out in the configuration stations 11. Downstream of the configuration station 11, the type of motor vehicle may be defined 13. The base frames 1 and/or the base modules 2 and/or the docking plates 4 may also be parked, or stored, in the configuration stations 11. Measurements, in particular, tolerance measurements, may be performed in the configuration station 11.

In a work station 12, a motor vehicle part, such as, for example, a vehicle body part, may be fitted to the docking plate 4, so that the motor vehicle part may be held by the receivers 3 of the docking plate 4.

At the start of production 14, the production of the specific motor vehicle type may then be carried out.

In the work station 12, the motor vehicle part may be equipped with add-on parts.

At block 15, via a different configuration of docking plates 4, the production of at least two different motor vehicle types may take place.

After the motor vehicle part has been equipped with add-on parts, the equipped motor vehicle part may be removed from the docking plate 4. A new motor vehicle part for equipping with add-on parts may be fitted to the docking plate 4.

After the end of body assembly 16, the base frame without motor vehicle part 17, in particular, a base frame 1 with base modules 2 and docking plates 4 connected to the base modules 2, may be transported to the configuration station 11 again or transported to a storage station 18, or a buffer. From the storage station 18, the base frame 1 may later be brought to the configuration station 11 again.

Figure 7:
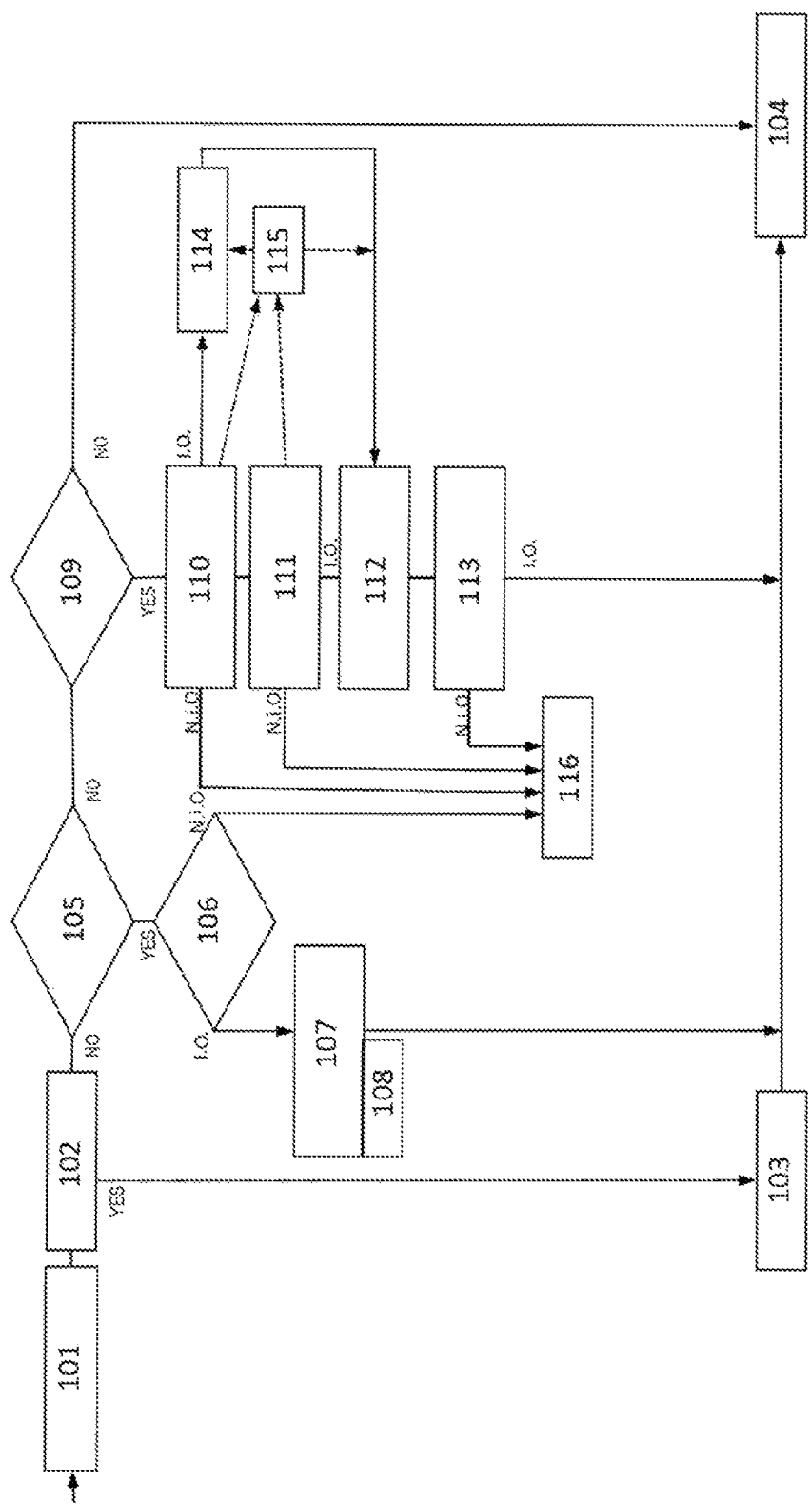
FIG. 7 illustrates a schematic representation of partial aspects of a method for the production of motor vehicles, in accordance with embodiments.

FIG. 7 illustrates a schematic representation of partial aspects of a method for the production of motor vehicles, in accordance with embodiments. Particularly, with regard to the measurement of the base frame 1, the base module 2, and the docking plates 4 (including receivers 3), for the selection and removal of the optimal docking plate 4 from the storage frame/rack 10, in order to be able to position the motor vehicle part for the production sequence with minimal position deviation and still within the permitted tolerance. The storage frame/rack 10 may comprise an intelligent register storage frame/rack 10.

At illustrated production block 101, the production sequence may be initiated or begin with a selection of a base frame 1 from a waiting position at a storage station 18.

The method may then proceed to illustrated production block 102, which parking position 102.

At illustrated production block 109, a central part of the measuring process starts with a decision as to whether repalletization is necessary, i.e., whether the base frame 1 is to be equipped with a new docking plate 4.

If "Yes," then an initial measurement of the receivers "ACTUAL" is carried out at illustrated production block 110. Meaning, the actual state of the base frame 1, the base modules 2, and the docking plate(s) 4 that are still on the base frame 1, including the receivers 3 thereof, is measured.

The method may then proceed to illustrated production block 114, should the state of the docking plates 4 and their corresponding receivers 3 are "in order" (i.O.), they are deposited at the storage position. The docking plate(s) 4 are thereby removed from the base frame 1, or from the base module 2, and placed in an empty storage position, in particular, an empty storage frame/rack position. From there, the docking plates may later be used for repalletization at illustrated production block 112, i.e., for fastening to a different base frame 1.

The method may then proceed to illustrated production block 111, where after the initial measurement of the receivers "ACTUAL," an initial measurement of base module-to-base frame "ACTUAL" is carried out. Meaning, a measurement of the base frame 1 and the one or more base modules 2 fixedly connected thereto and the deviation thereof from reference points on the base frame 1, i.e., a measurement without the docking plates 4.

The method may proceed to illustrated production block 115, which represents a programmable logic controller (PLC) configured to control the measurement sequence, and the broken arrows from illustrated production block 110 and illustrated production block 111 to illustrated production block 115 represent the transmission of the measured data obtained to the PLC. The PLC calculates the actual deviation of the docked docking plate 4 on the receivers 3 in relation to the base module 2 on the base frame 1. Since, in order to improve the cycle times, the docking plate 4 cannot be measured in a "master base frame" in the configuration station, the tolerance is to be back-calculated via the docking module/base module 2 on the base frame 1.

The measured data of the docking plate 4 may be stored via the PLC controller at the respective allocated storage position of the docking plate(s) 4 in the storage frame/rack (register storage frame/rack).

The arrow vertically downwards from illustrated production block 115 symbolizes that, as an alternative, in parallel with the direct step from illustrated production block 111, initial measurement base module-to-base frame "ACTUAL", to 112, repalletization, if the measured results were in order, a "best fit" tolerance calculation and docking plate selection from the respective storage frame/rack location may be carried out. The best fitting docking plate(s), in terms of tolerances, for the next base frame 1 in line, which has already been measured, out of all the docking plates 4 present in the storage frame/rack, is/are calculated.

At illustrated production block 112, the repalletization, or type change, of the docking plate 4 takes place: in which robotic arms grip the best fitting docking plate(s) 4, as determined by computation, from the respective storage position in the register storage frame/rack. The docking/palletization of the new docking plate 4 with/onto the base frame 1, or the base module(s) 2, is then carried out.

At illustrated production block 113, a final measurement of receivers "ACTUAL" is carried out, i.e., a measurement of the receivers 3, at the clamping points thereof, on the docking plate(s) which have just been docked, on the clamps/supports/brackets etc. which receive, for example, a body, a vehicle floor, or the client-specific component of the new vehicle type.

The measured value from the measurement of illustrated production block 113 is then compared to a predefined reliable tolerance value. If the new measured value, or the new tolerance value, is "not in order" (N. i. O), then the base frame 1 is ejected for measurement 116, i.e., for maintenance, servicing, measurement, or other more accurate testing.

At illustrated production block 104, should the tolerance values be "in order" (i.O), the base frame 1 now equipped with the new docking plates 4 may enter the production installation, namely, a work station 12.

The flow chart, FIG. 7, additionally illustrates, from illustrated production block 105 downwards, a measurement which may optionally be carried out. The parts of the device, in particular, docking plates 4, may be measured even if repalletization, or docking, of a new docking plate 4 does not have to be carried out, but also independently thereof, namely whenever a base frame 1 has completed a predefined number of production cycles. This is an additional test criterion, or an additional trigger for measurement, or quality control, of the device parts.

Illustrated production block 105 represents a determination as to whether a measurement is necessary according to the number of cycles. If "No," either measurement for reasons of repalletization takes place at illustrated production block 109, as described hereinbefore, or the base frame 1 may be introduced into a work station 12 again after a parking position at illustrated production block 102 and optionally after a specific residence time at illustrated production block 103.

If "Yes," i.e., a measurement is to be performed, an initial measurement of the receivers "ACTUAL" is carried out at illustrated production block 106, similarly to illustrated production block 110. If the measured values are "in order" (i.O.), the measured data is stored separately for each of the docking plates 4 and/or the installation as a whole 1, 2, 4 in step 107. The installation as a whole may then be introduced again, 108, for production in the work station, 104.

If the measured tolerances in step 106 are "not in order" (N.i.O.), the method proceeds to illustrated production block 116, where the equipped base frame 1 is ejected for measurement, i.e., for maintenance, servicing, measurement, or other more accurate testing, as is also the case if one of the tests at illustrated production block 110, illustrated production block 111, and illustrated production block 113 yields an unacceptable result.

The terms "coupled," "attached," or "connected" may be used herein to refer to any type of relationship, direct or indirect, between the components in question, and may apply to electrical, mechanical, fluid, optical, electromagnetic, electromechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

LIST OF REFERENCE SYMBOLS 1 base frame
2 base module
3 receiver
4 docking plate
5 bolt
6 clamping device
7 media interface
8 holding element
9 gripping system
10 store, storage frame/rack
11 configuration station
12 work station
13 type of motor vehicle defined
14 start of production
15 production of at least two different motor vehicle types
16 end of body assembly
17 base frame without motor vehicle part
18 storage station 101 base frame is selected from storage station
102 parking position
103 residence time
104 introduction into the work station
105 measurement necessary according to number of cycles
106 initial measurement receivers "ACTUAL"
107 measured data storage separately for docking plates and installation as a whole
108 introduction
109 repalletization necessary
110 initial measurement receivers "ACTUAL"
111 initial measurement base module to base frame "ACTUAL"
112 repalletization type change
113 final measurement receivers "ACTUAL"
114 deposition storage position
115 PLC
116 ejection for measurement

What is claimed is:

1. A method for production of a motor vehicle, the method comprising:
    providing a positioning device for positioning at least one motor vehicle part, the positioning device including a base frame having at least one base module arranged thereon, and at least one exchangeable docking plate stored on a storage frame, the at least one exchangeable docking plate being configured for connection to the at least one base module, the at least one exchangeable docking plate having arranged thereon a plurality of receivers configured to hold the at least one motor vehicle part;
    recording, in a memory unit, storage positions of the at least one exchangeable docking plate in the storage frame;
    calculating characteristic tolerance values for each individual exchangeable docking plate of the at least one exchangeable docking plate from measured characteristic tolerance values of the base frame with the at least one base module and said each individual exchangeable docking plate, and from measured characteristic tolerance values of the base frame with the at least one base module without said each individual exchangeable docking plate;
    recording, in the memory unit, the calculated characteristic tolerance values of said each individual exchangeable docking plate;
    transferring, by controlling one or more robotic arms via a control unit in response to the recorded calculated characteristic tolerance values and/or on the recorded storage positions, said each individual exchangeable docking plate to the base frame by removing said each individual exchangeable docking plate from the storage frame via the one or more robotic arms;
    connecting, at a configuration station via the one or more robotic arms, the at least one exchangeable docking plate to the at least one base module;
    fitting, at a work station, the at least one motor vehicle part to the at least one exchangeable docking plate such that the at least one motor vehicle part is held by the receivers; and
    equipping, via the one or more robotic arms and after fitting the at least one motor vehicle part to the at least one exchangeable docking plate, the at least one motor vehicle part with add-on parts.

2. The method of claim 1, further comprising, after equipping the at least one motor vehicle part with the add-on parts:
    removing the equipped at least one motor vehicle part from the at least one exchangeable docking plate; and
    transporting the base frame with the at least one base module connected thereto and the at least one exchangeable docking plate, to the configuration station.

3. The method of claim 1, further comprising, after equipping the at least one motor vehicle part with the add-on parts:
    removing the equipped at least one motor vehicle part from the at least one exchangeable docking plate; and
    transporting the base frame with the at least one base module connected thereto and the at least one exchangeable docking plate, to a storage station.

4. The method of claim 1, wherein, for the production of two motor vehicles of different motor vehicle types, two different exchangeable docking plates are connected to two base modules arranged on the base frame.

5. A method for production of a first motor vehicle of a first motor vehicle type and a second motor vehicle of a second motor vehicle type that is different from the first motor vehicle type, the method comprising:
    providing a positioning device for positioning motor vehicle parts, the positioning device including:
        a first base frame having at least one first base module arranged thereon, and at least one exchangeable first docking plate stored on a storage frame, the at least one first exchangeable docking plate being configured for connection to the at least one first base module, the at least one exchangeable first docking plate having arranged thereon a plurality of first receivers configured to hold the motor vehicle parts for the first motor vehicle; and
        a second base frame having at least one second base module arranged thereon, and at least one exchangeable second docking plate stored on the storage frame, the at least one exchangeable second docking plate being configured for connection to the at least one second base module, the at least one exchangeable second docketing plate having arranged thereon a plurality of second receivers configured to hold the motor vehicle parts for the second motor vehicle;
    recording, in a memory unit, storage positions of the at least one exchangeable first docking plate and the at least one exchangeable second docking plate in the storage frame;
    calculating characteristic tolerance values for said each individual exchangeable first docking plate of the at least one exchangeable first docking plate from measured characteristic tolerance values of the base frame with the at least one first base module and said each individual exchangeable first docking plate, and from measured characteristic tolerance values of the base frame with the at least one first base module without the individual exchangeable first docking plate;
    calculating characteristic tolerance values for said each individual exchangeable second docking plate of the at least one exchangeable second docking plate from measured characteristic tolerance values of the base frame with the at least one second base module and said each individual exchangeable second docking plate, and from measured characteristic tolerance values of the base frame with the at least one second base module without the individual exchangeable second docking plate;

recording, in the memory unit, the calculated characteristic tolerance values of said each individual exchangeable first docking plate and said each individual exchangeable second docking plate;

transferring, by controlling one or more robotic arms via a control unit in response to the recorded calculated characteristic tolerance values and/or on the recorded storage positions, the at least one exchangeable first docking plate to the first base frame and the at least one exchangeable second docking plate to the second base frame by removing the at least one exchangeable first docking plate and the at least one exchangeable second docking plate from the storage frame via the one or more robotic arms;

connecting, at a configuration station via the one or more robotic arms, the at least one exchangeable first docking plate to the first base module and the at least one exchangeable second docking plate to the second base module;

fitting, at a work station, a motor vehicle part for the first motor vehicle to the at least one exchangeable first docking plate, such that the motor vehicle part for the first motor vehicle is held by the first receivers, and a motor vehicle part for the second motor vehicle to the at least one exchangeable second docking plate, such that the motor vehicle part for the second motor vehicle is held by the second receivers; and equipping, via the one or more robotic arms and after fitting the motor vehicle part for the first vehicle to the at least one exchangeable docking plate and the motor vehicle part for the second motor vehicle to the at least one exchangeable docking plate, the motor vehicle part for the first motor vehicle and the motor vehicle part for the second motor vehicle with add-on parts.

* * * * *